United States Patent
Pfeifer

[11] 3,904,256
[45] Sept. 9, 1975

[54] SUPPORTING PIVOT SYSTEM FOR A CENTRIFUGE BOWL

[75] Inventor: Hans Pfeifer, L'Isle Adam, France

[73] Assignee: Commissariat a l'Energie Atomique, Paris, France

[22] Filed: June 21, 1973

[21] Appl. No.: 372,238

[30] Foreign Application Priority Data
June 29, 1972 France .............................. 72.23529

[52] U.S. Cl. ................ 308/159; 308/139; 308/141; 308/148; 308/158
[51] Int. Cl. ............................................ F16c 32/00
[58] Field of Search .......... 308/159, 139, 141, 148, 308/158

[56] References Cited
FOREIGN PATENTS OR APPLICATIONS
1,577,754   10/1969   France ................................ 308/159

Primary Examiner—Charles J. Myhre
Assistant Examiner—R. H. Lazarus
Attorney, Agent, or Firm—Flynn & Frishauf

[57] ABSTRACT

A step-bearing pivot having a spherical lower end is secured to the centrifuge bowl and a spherical step-bearing cup formed at the bottom of a lifting-oil chamber rests on elastic damping means which essentially comprise a hollow elastic shaft surrounded by and attached to a hollow damping support of slightly conical shape, a leak-tight cylindrical-conical outer casing which forms a closed space containing the shaft-support assembly and filled with damping oil which has low variation of viscosity, an inner tube and axial deflector for ensuring laminar flow of a cooling fluid within the central portion of the hollow elastic shaft.

10 Claims, 4 Drawing Figures

SUPPORTING PIVOT SYSTEM FOR A CENTRIFUGE BOWL

This invention relates to a supporting pivot system for a centrifuge bowl.

It is generally known that a bowl of this type weighs several kilograms and is designed to rotate without stopping for long periods of time (several years if possible) without any need for maintenance of its pivot system and at high speeds attaining several hundred revolutions per second; as a rule, the bowl rotates in a high vacuum in order to reduce losses by ventilation and power consumption of the driving motor, and in frequent instances even in a deleterious chemical environment.

A number of different solutions have been contemplated in the past. It has been proposed in particular to employ bearings of very high quality and while these have the advantage of small overall size, it proves an extremely difficult matter to design a bearing having a sufficiently long lifetime. It has also been proposed to make use of bearings or thrust-bearings either of the magnetic type or gas type. However, devices of this kind are cumbersome when they are intended to operate at low pressure (a few millimeters of mercury) in a gas having low viscosity and when they are intended to produce lifting forces which are compatible with the weights to be carried. It is also difficult to adjust the stiffness of magnetic or gas bearings with a view to taking into account variations in rotational velocity of the bowl from the time of start-up to normal speed in continuous operation. Moreover, among the numerous technical difficulties which have to be solved for the utilization of a pivot system which is capable of satisfying the requirements stated in the foregoing, one of the most serious difficulties arises from the highly dangerous movements of precession and nutation to which the bowl is subjected as a result of its extremely high rotational velocity. These movements must be damped and one expedient which has already been contemplated for this purpose consists in supporting the step bearing of the pivot system by means of an elastic suspension which carries the female portion of this latter. Up to the present time, consideration has been given to different solutions of this general type, examples of which can be found in French Pat. No. 1,577,754 or in U.S. Pat. No. 3,216,655. These designs are nevertheless very imperfect and do not permit damping to such a satisfactory extent as to ensure protection of the pivot system against failure or rapid wear which would result in considerable reduction of its useful life.

In point of fact, the damping device which is disclosed in French Pat. No. 1,577,754 is neither linear nor isotropic. Furthermore, neither the ball nor the cup are grooved and since there is no pressurization, metal-to-metal contacts are inevitable.

In the bottom bearing described in U.S. Pat. No. 3,216,655, the same liquid serves to carry out damping and to form the bearing film. In consequence, adjustment of damping by cooling the liquid affects both the efficiency and the load-carrying capacity of the step bearing.

The precise aim of the present invention is to provide a supporting pivot system for a centrifuge bowl which meets practical requirements more effectively than comparable systems which have been proposed heretofore. This pivot system is capable of operating in high vacua (of the order of $10^{-3}$ mm Hg) and is capable of carrying a rotating mass weighing several kilograms at speeds up to 1,000 rpm or more.

The aforesaid supporting pivot system for a centrifuge bowl of the type comprising in known manner a step bearing in which the male portion or pivot is secured directly to the bottom portion of the bowl and in which the female portion rests on elastic damping means is characterized in that said elastic damping means essentially comprise:

a hollow elastic shaft having a cylindrical shape and terminating at the top end in a lifting-oil reservoir chamber, the spherical female cup of the step bearing being formed as a recess in the bottom of said chamber, a damping support of hollow construction which surrounds the hollow shaft and is of slightly conical shape, said shaft being inserted into the lower end of said support, a casing of substantially cylindrical-conical shape which is secured to the base of the support and to the top end of the elastic shaft so as to enclose the shaft-support assembly in leak-tight manner and to form on the one hand between said shaft and said support and on the other hand between said support and said casing a closed space filled with damping oil having low variation of viscosity, means provided in the hollow central portion of the elastic shaft for ensuring laminar flow of a cooling fluid.

The very special arrangement of the hollow elastic shaft which is inserted at the lower end thereof into a hollow damping support of conical shape makes it possible to effect the requisite damping by means of a double circular throttling of the damping oil which is maintained under pressure between on the one hand the shaft and the support and on the other hand the support and the casing.

By virtue of the arrangement according to the invention, the elastic shaft is also permitted to perform two functions at the same time, namely the function of a support for the female spherical cup of the step bearing and, at the top end thereof, the function of a support for the lifting-oil reservoir chamber.

The different welded joints between the elements of the pivot system in accordance with the invention (leak-tightness of the hollow elastic shaft with respect to the damping support, attachment of the casing on the one hand to the damping support and on the other hand to the top end of the shaft) are readily made by means of the electronic beam welding technique, the use of this technique being particularly convenient for components of this size, especially by reason of the high degree of accuracy with which it can be performed.

In accordance with another feature of this invention which is equally important, the casing surrounding the assembly which consists of the hollow shaft and the damping support is metallic and is provided on the one hand with a predetermined number of annular expansion chambers for the damping oil and on the other hand with a bellows element which forms an integral part of the metallic wall of the casing and is located substantially at the level of the nodal point of the hollow elastic shaft. This particular arrangement of the metallic casing is important, especially in regard to the presence of an expansion bellows element at the level of the nodal point of the hollow elastic shaft since the casing is thus prevented from playing any contributary part in the elastic return of the shaft to its position of equilibrium at the time of movements of precession of said shaft. To this end, the damping oil is selected from the oils which have a low variation of viscosity as a function of temperature and the pressure of said oil is adjustable. In any case, a compensation bellows element placed at the lower end of the hollow shaft serves to maintain the oil at the desired pressure in order to prevent any cavitation which could otherwise occur as a result of the damping effect and throttling of the oil which produces zones of reduced pressure. Finally, provision is made at the top portion of the damping support for a protective ring which is flush-mounted on the internal face of the support opposite to the hollow elastic shaft. Said protective ring is formed of material having a high degree of hardness (stellite) in order to withstand inevitable frictional contacts with the top portion of the shaft at the time of abnormally strong movements of precession of the bowl and is simply force-fitted at the upper end of the support.

In accordance with another very important feature of the present invention, the oil employed for lifting the male portion of the step bearing has a substantial variation of viscosity as a function of temperature and said viscosity decreases sharply when said temperature increases. By making provision on the male spherical portion of the step bearing for a system of hollow grooves which are preferably in the form of loxodromes, there is thus obtained in accordance with the invention an effect of intense pressurization of the lifting-oil film (by turbopump effect resulting from the rotation of the male portion with respect to the cup in the appropriate direction) and consequent lifting of the pivot with respect to the cup. Since the heat developed at the time of rotation of the step bearing is removed in accordance with the invention by means of a cooling fluid which circulates within the hollow portion of the elastic shaft, it is thus possible not only to remove the developed thermal energy but also to establish self-regulation of the load-carrying capacity of the step bearing by means of an automatic variation of the lifting-oil viscosity as a function of the temperature.

In fact, if the pivot has a tendency to lift at any given moment under the action of an increase in velocity of the bowl and therefore in the pressure developed on the oil film, the temperature also increases with the velocity, thereby causing a reduction in viscosity and in load-carrying capacity, with the direct result that the pivot tends to return downwards. It is thus possible to obtain an approximately constant pivot-lifting force over wide ranges of temperature extending from 0° to 40°C, for example; similarly, inasmuch as the temperature of the oil film and therefore the load-carrying capacity are established as a function of the rotational velocity of the bowl, automatic uplift or bottoming of the step-bearing pivot are obtained in respect of a velocity of the order of 0.5 rpm per second. In this manner, the destructive effects of rubbing friction in the dry state are extremely slight so that, with the possible exception of accident conditions, wear of the pivot system is reduced to a negligible rate by a suitable choice of the materials which constitute the pivot and the cup.

In addition, since the very high speed of rotation of the male portion of the step bearing at the center of the oil chamber is liable to have the unfavorable effect of inducing rotational motion of the oil, provision is made in accordance with the invention to form within said oil chamber a predetermined number of stationary radial fins which are intended to prevent any such displacement of oil in rotational flow.

When the supporting pivot system in accordance with the invention is constrained to operate in a relatively high vacuum (a few millimeters of mercury), a further difficulty arises from the fact that the lifting-oil contained within the reservoir chamber is liable to vaporize rapidly even if it has a relatively low vapor tension. In the present invention, it is accordingly intended to overcome this disadvantage by making provision in the top portion of the oil chamber for a member having substantially the shape of a spherical zone and for grooves, especially in the form of loxodromes, which are cut in the surface of said member and inclined to the axis; in this case, the bowl of the centrifuge accordingly terminates at the lower end in a smooth flared portion which also has the shape of a spherical zone and is placed over the above-mentioned spherical member. The direction of the grooves which are cut in the top wall of the oil chamber is such that, at the time of rotation of the bowl in the normal direction, there is a resultant pump effect (in which case the assembly consisting of the male and female spherical members constitutes a Holweck pump) which forces back to the interior of the reservoir chamber any oil molecules which may tend to escape therefrom. This simple as well as effective arrangement constitutes a virtual seal between the interior and the exterior of the oil reservoir chamber. The foregoing does not imply any limitation in regard to the arrangement of the spiral grooves which can equally well be cut on the bottom flared portion of the bowl, in which case the oil chamber has a smooth top wall.

Finally, in order to prevent any upward flow of oil along the male portion of the step bearing, it has proved advantageous to design said bearing in the form of a spherical portion joined to a conical portion, said conical portion being surmounted by a cylindrical barrier ridge. Similarly, the cup of the step bearing is advantageously constituted by a smooth hemispherical cavity extended at the top portion thereof by a cylindrical portion having the same internal diameter as the cavity and in coaxial relation to this latter.

A clearer understanding of the invention will in any case be gained from the following description of one example of construction of a supporting pivot system for a centrifuge bowl, this description being given with reference to the accompanying drawings, in which.

Figure 1:
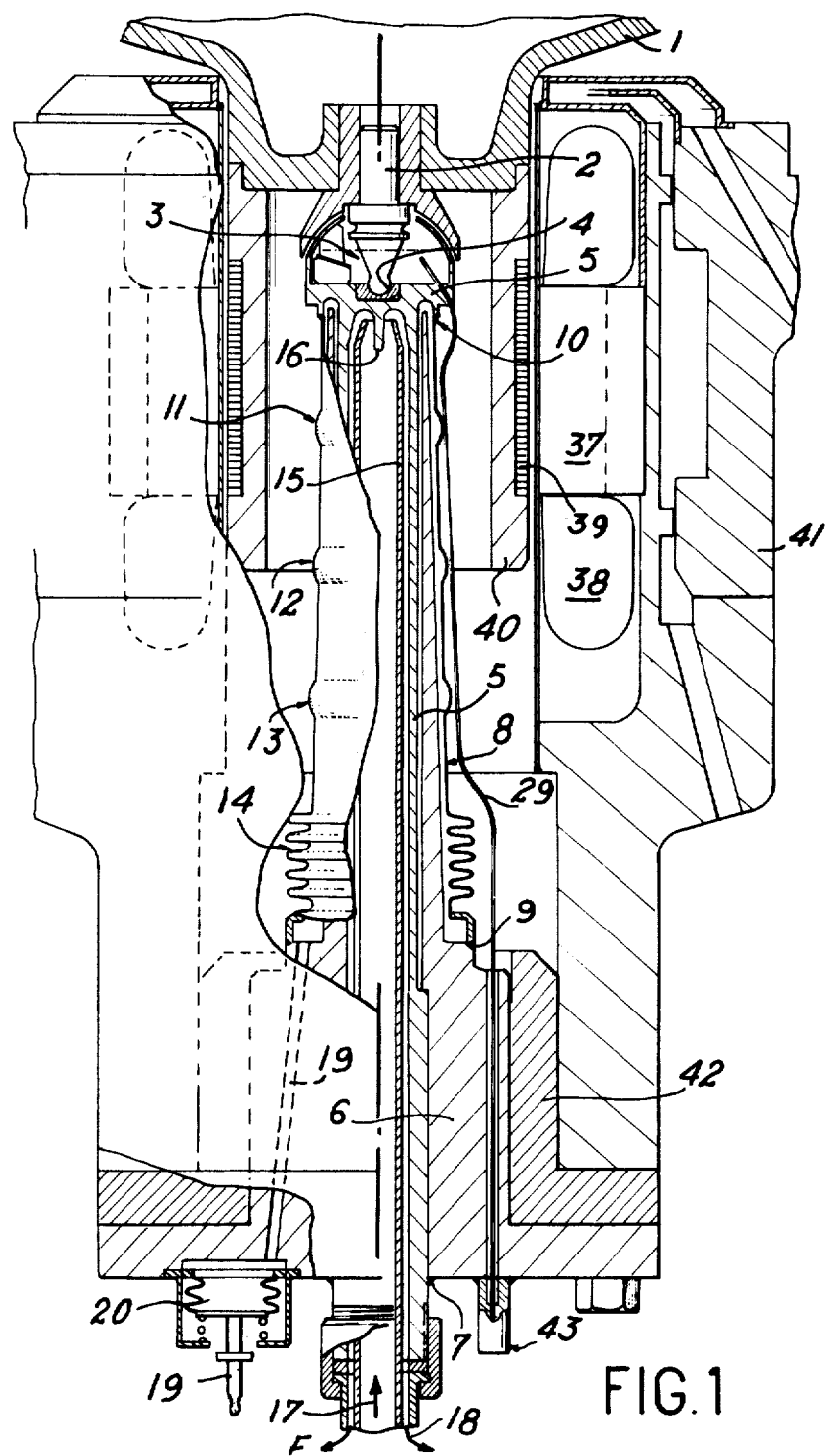
FIG. 1 is a general diagrammatic view taken partly in cross-section along the axis and showing a supporting pivot system for a centrifuge bowl.

There is shown in FIG. 1 the bottom portion of a centrifuge bowl 1 on which is fixed the pivot 2 of the step bearing 3. In accordance with the invention, the cup 4 of the step bearing 3 is supported at the top portion thereof by the hollow shaft 5 of cylindrical shape and fitted at the bottom portion thereof within the damping support 6. The damping support 6 is also of hollow construction and of slightly conical shape and surrounds the shaft 5. The shaft 5 is fabricated from high-flexibility maraging steel and the damping support 6 is formed of chromium stainless steel. Leak-tightness between the hollow elastic shaft 5 and the damping support 6 is ensured by means of a weld fillet 7.

The assembly comprising the hollow shaft 5 and the damping support 6 is surrounded by a metallic casing 8 which is also attached in leak-tight manner by welding its lower end at 9 to the damping support 6 and its upper end at 10 to the top projecting portion of the hollow shaft 5. In accordance with the invention, said metallic casing 8 is provided with a predetermined number of annular bulges such as those designated in FIG. 1 by the references 11, 12 and 13 for ensuring rigidity of said casing and also with a bellows element 14 located at the level of the nodal point about which the hollow shaft 5 oscillates under the influence of the movements of precession of the bowl 1.

A cylindrical member 15 is placed inside the hollow shaft 5 so as to define with the axial deflector 16 which is joined to the top projecting portion of said shaft two separate spaces which permit laminar flow of a cooling fluid along a path having a hairpin profile. In the embodiment described with reference to FIG. 1, said cooling fluid consists of alcohol at a low temperature in the vicinity of 0°C and the flow path of which is represented by the arrows. Said alcohol passes into the lower end of said cylindrical member at 17 in the axis of the hollow shaft 5. After absorbing the heat developed within the cup of the step bearing, the fluid then flows into the outer zone along the hollow shaft 5 and is finally discharged at the lower end of this latter at 18. Cooling is so adjusted that the temperature of the lifting-oil under conditions of rest is of the order of 1° to 2°C.

A damping oil fills the entire space which is formed between on the one hand the hollow shaft 5 and the damping support 6 and on the other hand said support and the casing 8. Said damping oil is introduced through the duct 19 and is maintained by means of the compensation bellows element 20 at a constant pressure of the order of 2 kg/cm², for example. Said damping oil is advantageously chosen so as to have a coefficient of viscosity which varies only slightly as a function of the temperature.

Figure 2:
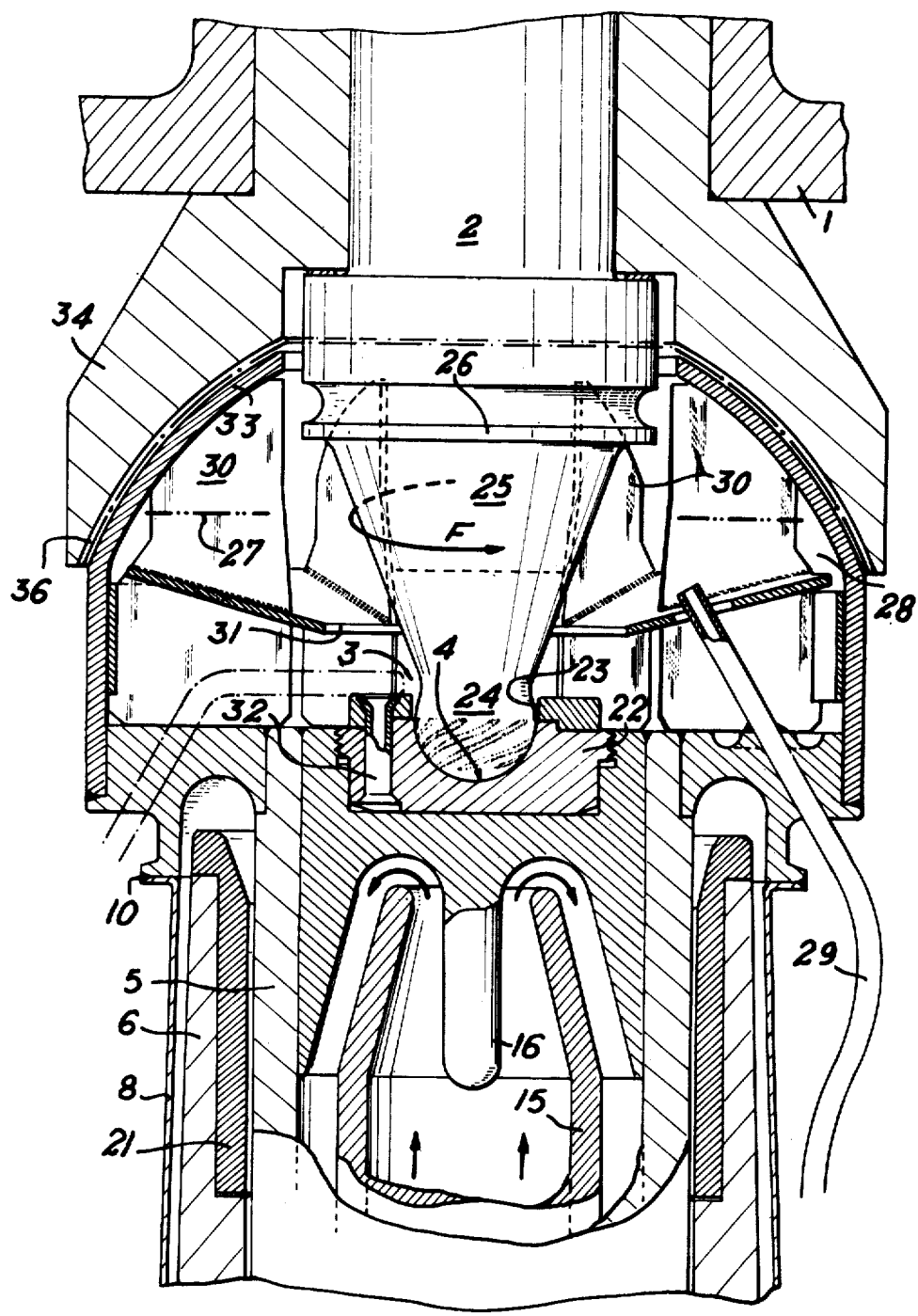
FIG. 2 is a view in sectional elevation showing the constructional detail of the top portion of the pivot system of FIG. 1.

The step bearing 3 proper and that part of the pivot system which is located in the immediate vicinity of said bearing will now be described with reference to FIG. 2 which is drawn to a larger scale and provides a clearer illustration of the constructional details.

In this figure, there can first be seen the protective stellite ring 21 which is flush-mounted in the top portion of the damping support 6 and intended to provide protection against any contacts which may take place between the hollow shaft 5 and the damping support 6 at the time of movements of said shaft under the influence of the centrifuge bowl 1.

The female hemispherical cup 4 of the step bearing 3 is hollowed-out in an added member 22 which is fitted within the top projecting portion of the shaft 5. In accordance with the invention, said hemispherical cup 4 is extended by a straight cylindrical portion 23 having the same diameter as the cup 4. In the example herein described, the cup 4 has a diameter of 4.5 mm and the diameter of the cylindrical portion 23 is the same to within 1 μm. The function of said cylindrical portion 23 is to ensure radial stiffness of the pivot 2. The male pivot of the step bearing 3 is provided at its base with an overhemispherical portion 24 surmounted by a conical portion 25 which is joined to the portion 24 along a continuous concave profile as drawn in FIGS. 2 and 3. The conical portion 25 itself is surmounted by a cylindrical ridge 26 in order that the oil contained in the reservoir chamber 28 up to the level 27 may be prevented by said ridge from flowing upwards under the effect of rotational motion of the step-bearing pivot in the direction of the arrow F. Said oil chamber 28 is located at the top end of the shaft 5 and fixed on this latter. The lifting-oil is injected into the chamber through a pipe 29 having an external opening 43 (as shown in FIG. 1) and is not subjected to any forced circulation within said chamber; on the contrary, a predetermined number of radial partitions or fins 30 braced by distance-plates 31 are placed in position in order to prevent the oil from being displaced in rotational flow motion.

In order to check the temperature of the step bearing, thermocouples such as 32 are placed at predetermined points of the added member 22.

The top portion of the chamber 28 terminates in a wall 33 having the shape of a spherical zone over which is placed a smooth flared portion 34 forming part of the lower end of the bowl 1 and having a female shape which corresponds to that of the male wall 33. The lower end of the bowl 1, the flared portion 34 and the upper portion of the pivot 2 are connected together mechanically and are consequently rigidly fixed in rotation to the male portion of the step bearing.

Figure 3:
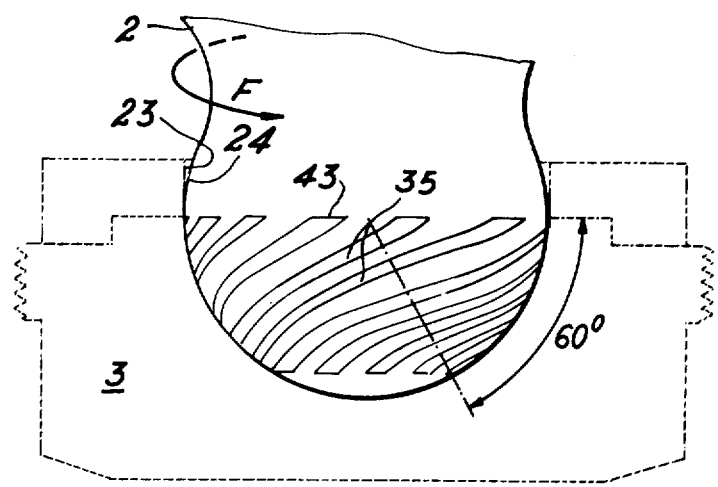
FIG. 3 is a view in elevation showing one form of construction of the male pivot of the step bearing of the pivot system of FIG. 1.

Referring now to FIG. 3, there can be seen the constructional design of the lower end of the step-bearing pivot 2 with its overhemispherical portion 24 which is provided over part of its height with a predetermined number of grooves 35 cut in the surface of the pivot and preferably curved in the form of loxodromes. This shape corresponds to the optimum effect which it is sought to achieve in the compression of the lifting-oil film by turbopump effect but it remains apparent that other "spiral" curves can be adopted without departing from the scope of the invention. The cut grooves begin at the equator 43 of the hemispherical portion 24 and terminate at the latitude of approximately 60° in order to leave a smooth spherical segment of contact between the pivot and the cup 4 in the state of rest and at the moment of starting-up and stopping. The pivot 2 is formed of nitrided steel.

Figure 4:
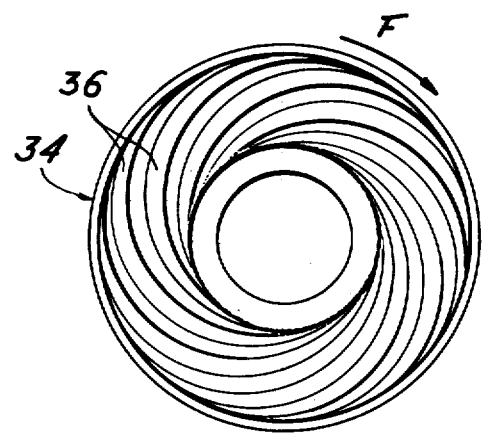
FIG. 4 is an overhead view showing the top spherical annular zone of the reservoir chamber for the lifting oil.

The operation of the seal constituted by the Holweck pump which is provided between the flared member 34 and the top wall 33 of the oil chamber 28 will now be understood by reference to FIG. 4. In fact, said wall 33 has a number of grooves such as 36 which are inclined to the axis and cut so as to form recesses in said wall, the result thereby achieved at the time of rotation of the bowl being to trap within the oil chamber 28 any molecules of lifting-oil which would otherwise have a tendency to escape from said chamber.

Driving of the bowl 1 of the centrifuge by a hysteresis motor does not strictly form part of the present invention but permits starting-up and stopping of the bowl in controlled synchronous operation; however, in order to complete the description of FIG. 1, the motor 37 as illustrated and fitted with its magnetic windings 38 produces action directly on a magnetic element 39 which is flush-mounted within an annular cylindrical hollow shaft 40, said shaft being secured to the lower end of the bowl 1. In the example of construction shown in FIG. 1, the motor 37 is fixed by means of a frame 41 on the lower portion of the damping support 6 and is separated from this latter by a ceramic component 42 which constitutes a heat insulator.

What we claim is:

1. A supporting pivot system for a centrifuge bowl of the type comprising in known manner a step bearing in which the male portion or pivot is secured directly to the bottom portion of the bowl and in which the female portion rests on elastic damping means, wherein said elastic damping means essentially comprise:
   - a hollow elastic shaft having a cylindrical shape and terminating at the top end in a lifting-oil reservoir chamber, the spherical female cup of the step bearing being formed as a recess in the bottom of said chamber,
   - a damping support of hollow construction which surrounds the hollow shaft and is of slightly conical shape, said shaft being inserted into the lower end of said support,
   - a casing of substantially cylindrical shape which is secured to the base of the support and to the top end of the elastic shaft so as to enclose the shaft-support assembly in leak-tight manner and to form on the one hand between said shaft and said support and on the other hand between said support and said casing a closed space filled with damping oil having low variation of viscosity,
   - means provided in the hollow central portion of the elastic shaft for ensuring laminar flow of a cooling fluid.

2. A supporting pivot system according to claim 1, wherein the casing is metallic and is provided on the one hand with a number of bulges for endowing said casing with rigidity and on the other hand with a bellows element which forms an integral part of the metallic wall of the casing and is located substantially at the level of the nodal point of the hollow elastic shaft.

3. A pivot system according to claim 2, wherein a system of hollow grooves in the form of loxodromes is cut in the spherical male portion of the step bearing over at least part of its height to permit use of lifting oil having substantial variation of viscosity as a function of temperature.

4. A supporting pivot system according to claim 1, wherein the damping support is fitted with a protective member in the internal top portion thereof in adjacent relation to the hollow elastic shaft.

5. A pivot system according to claim 1, wherein a system of hollow grooves in the form of loxodromes is cut in the spherical male portion of the step bearing over at least part of its height, the lifting-oil being such as to have a substantial variation of viscosity as a function of the temperature.

6. A supporting pivot system according to claim 1, wherein the top hemispherical wall of the lifting-oil chamber forms the first component of a Holweck pump in which the second component is constituted by a hemispherical flared portion which forms part of the lower end of the centrifuge bowl and is placed over said first component.

7. A supporting pivot system according to claim 6, wherein the lifting-oil reservoir chamber is provided with a predetermined number of radial pins for preventing displacement of the oil in rotational flow motion.

8. A supporting pivot system according to claim 1, wherein the spherical female cup of the step bearing is surmounted by a cylindrical portion which is coaxial with the pivot.

9. A supporting pivot system according to claim 1, wherein the male portion of the step bearing is constituted by a spherical portion joined to a conical portion surmounted by a cylindrical ridge for preventing the upward progression of the oil film.

10. A pivot system according to claim 1, wherein the centrifuge bowl is driven by a hysteresis motor carried by a member which is fixed on the damping support with inter-position of a heat insulator.

* * * * *